May 29, 1928.
A. E. SILVESTRE
1,671,211
NOVEL VISE FOR MACHINE TOOLS
Filed Oct. 27, 1926    2 Sheets-Sheet 1
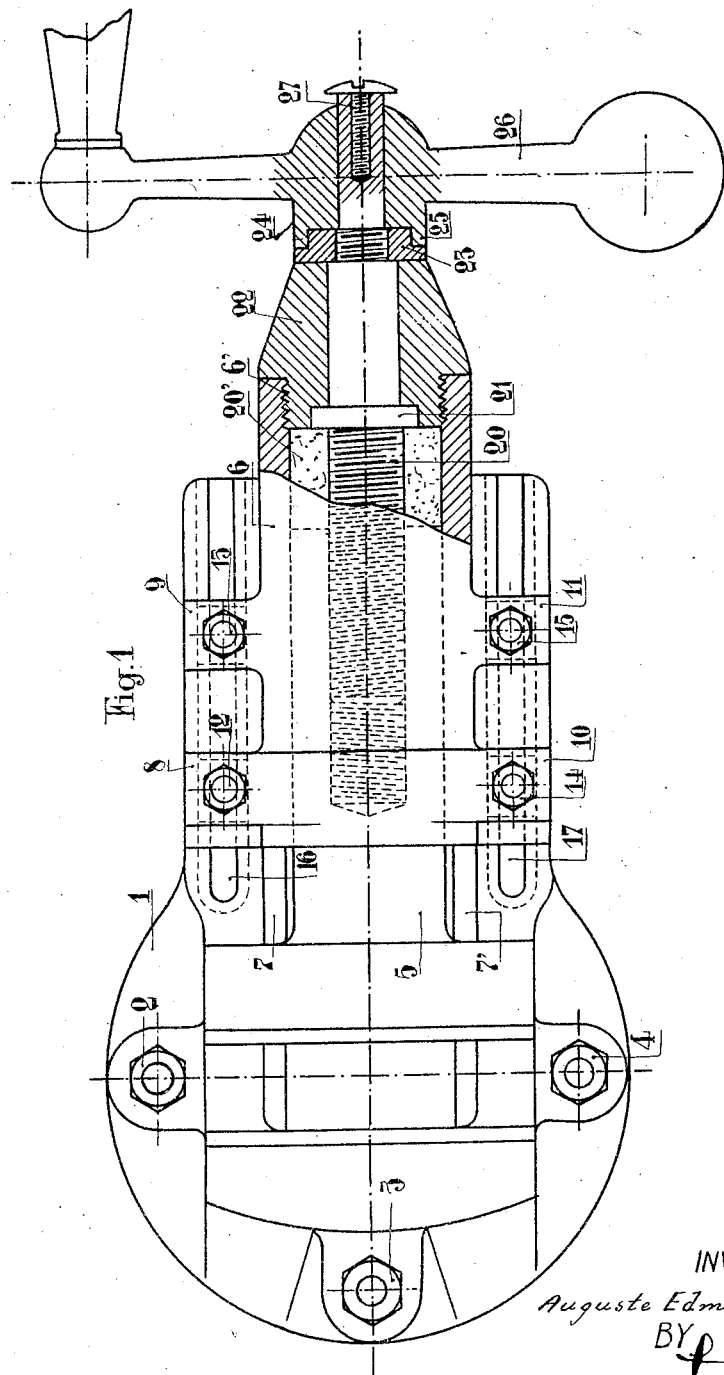
INVENTOR:
Auguste Edmond Silvestre
BY
ATTORNEY May 29, 1928.
A. E. SILVESTRE
1,671,211
NOVEL VISE FOR MACHINE TOOLS
Filed Oct. 27, 1926   2 Sheets-Sheet 2
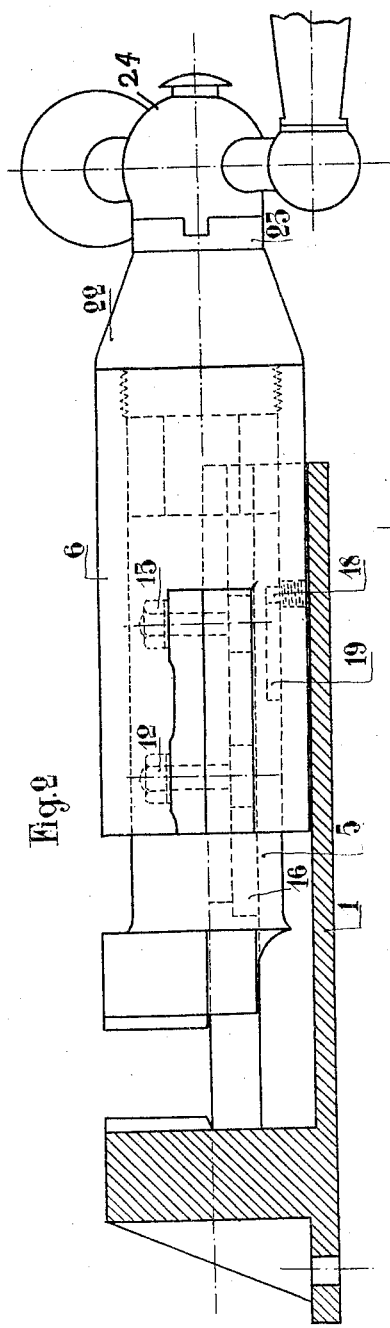
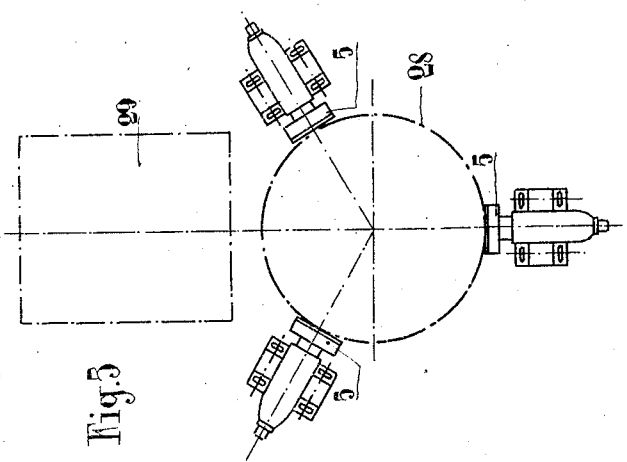
INVENTOR:
Auguste Edmond Silvestre
BY
ATTORNEY Patented May 29, 1928.

1,671,211

UNITED STATES PATENT OFFICE.

AUGUSTE EDMOND SILVESTRE, OF PARIS, FRANCE.

NOVEL VISE FOR MACHINE TOOLS.

Application filed October 27, 1926, Serial No. 144,552, and in France November 4, 1925.

The object of my invention is to provide a movable jaw construction peculiarly applicable to machine-tool vises but broadly usable with all vises and otherwise as, for instance, where work of special form or of large size is required to be held, in which case the movable jaws can be any in number.

In the drawings appended hereto and illustrating, as an example an embodiment of my invention:

Figure 1 is a plan view of a vise embodying the improved jaw mounting.

Figure 2 is a side elevation of Figure 1, the guide for the jaw being shown in section.

Figure 3 is a plan view showing the method of using the movable jaw in order to hold work circular in shape on the table of a machine-tool.

When applying the movable jaw to a vise, the entire device is mounted on a bed or base member 1 secured to the table of the machine-tool by bolts and nuts 2, 3 and 4, said member 1 insuring perfect guiding of jaw 5. The jaw 5 is engaged in a tubular housing or sleeve 6 mounted between a pair of longitudinal guides 7, 7' and provided with integral, lateral lugs 8, 9, 10 and 11 which rest slidably on the top faces of the guides and thus permit the sleeve or jaw holder to be adjustably secured on member 1 by means of bolts and nuts 12, 13, 14 and 15, the stems of these bolts working in T-shaped slots 16 and 17 in the guides. The relative movement between jaw 5 and its holder 6 is limited by a pin 18 which is fixed to said holder and projects into a slot 19 formed in jaw 5.

The jaw adjusting screw 20 is entirely sheltered from outside shocks; it rotates within a bushing 20' containing grease and is maintained in place by means of an annular shoulder 21 on the screw that fits in a recess formed in the inner face of a cap 22 that is screwed on holder 6 by means of thread 6'. A notched disk or clutch member 23 is screwed on the stepped outer portion of the screw shaft 20 and is adapted to be coupled or clutch to the hub 24 of a crank handle 26 by means of teeth or projections 25 on said hub which engage the notches in disk 23. Handle 26 is fastened to the stepped end of screw 20 by means of a screw 27 in such a way as to allow it sufficient lateral play to release the clutch parts from their notches.

The jaw holder or sleeve 6 which is shiftable according to the thickness of the parts to be clamped, is, owing to this faculty, used with a minimum of overhang; as a matter of fact its travel is limited by the connection constituted by slot 19 and pin 18, the effect of this connection being to necessitate the whole set to be shifted when the travel proves inadequate.

Guidance of the set is therefore perfect and the movable jaw cannot get askew in the case of work being gripped by the ends.

Another utilization of the movable jaw 5 is illustrated in Figure 3. In this case several jaws are arranged around the work 28 to be machined, each of the jaws 5 being secured at a suitable place on the table of the machine-tool 29.

I have given these two methods of arrangement and operation of the movable jaw merely as examples and I reserve the right to use the said jaw either separately or in combination with any machine without being deemed to depart from the scope of my invention.

I claim as my invention:

1. In a vise, the combination of a movable jaw; an operating screw therefor having a stepped outer portion; a clutch disk threaded on said screw against the face of the step, the portion of the screw beyond said disk being plain; a handle for rotating said screw having its hub provided with a complemental clutch member, said hub being mounted to slide laterally on the plain portion of the screw to bring its clutch member into or out of engagement with the first-named clutch member; and a device for connecting said handle hub to said screw while permitting such lateral movement.

2. In a vise, the combination of a movable jaw; a tubular holder wherein the stem of the jaw is slidably fitted; a cap threaded on the outer end of the holder; a bushing in said holder adjacent its outer end and containing grease; an operating screw for said jaw rotatably mounted in said bushing and engaged at its inner end with the jaw stem, the outer portion of the screw passing through and beyond said cap; an annular shoulder on said screw rotatably fitting in a recess in the inner face of said cap and clamped between the latter and the bushing to prevent endwise movement of the screw; and a handle for rotating said screw attached to the projecting outer end thereof.

3. In a vise, a bed plate; a pair of spaced guides thereon provided with longitudinal vertical slots; a tubular jaw holder mounted for longitudinal adjustment bodily between said guides and having perforated lugs which project laterally across the upper faces of the guides; fastening devices passing through said lugs and slots to secure the holder in adjusted position; a movable jaw having its stem slidably fitted in the holder; a cap on the outer end of said holder; an operating screw projecting through said cap and holder and engaged at its inner end with the jaw stem to move the jaw in either direction independently of the adjustment of the holder; and a pin-and-slot connection between the holder and jaw stem to limit the movement of the jaw in both directions.

In testimony whereof I affix my signature.

AUGUSTE EDMOND SILVESTRE.